United States Patent
McSweeney et al.

(10) Patent No.: US 9,245,504 B1
(45) Date of Patent: Jan. 26, 2016

(54) INSTRUCTIONAL DRUM MUSIC PRACTICE DEVICE

(71) Applicants: Gerard McSweeney, West Islip, NY (US); Maryann McSweeney, West Islip, NY (US); Ryan McSweeney, West Islip, NY (US); Sean McSweeney, West Islip, NY (US); Dennis Ricci, Farmingdale, NY (US); Jerry Ricci, Bethpage, NY (US)

(72) Inventors: Gerard McSweeney, West Islip, NY (US); Maryann McSweeney, West Islip, NY (US); Ryan McSweeney, West Islip, NY (US); Sean McSweeney, West Islip, NY (US); Dennis Ricci, Farmingdale, NY (US); Jerry Ricci, Bethpage, NY (US)

( * ) Notice: Subject to any disclaimer, the term of this patent is extended or adjusted under 35 U.S.C. 154(b) by 0 days.

(21) Appl. No.: 14/827,164

(22) Filed: Aug. 14, 2015

Related U.S. Application Data

(60) Provisional application No. 62/039,113, filed on Aug. 19, 2014.

(51) Int. Cl.
*G10D 13/02* (2006.01)
*G09B 15/00* (2006.01)

(52) U.S. Cl.
CPC .............. *G10D 13/029* (2013.01); *G09B 15/00* (2013.01)

(58) Field of Classification Search
CPC ..... G10D 13/02; G10D 13/026; G10D 13/00; G10D 13/027; G10D 3/00; G10D 5/00; G10D 13/029; F16B 37/042; G09B 15/02; G09B 15/00

USPC ........................ 84/411 P, 411 R, 470 R, 421
See application file for complete search history.

(56) References Cited

U.S. PATENT DOCUMENTS

| | | |
|---|---|---|
| 4,179,974 A | 12/1979 | Trankle |
| 5,520,090 A | 5/1996 | Eagle |

(Continued)

OTHER PUBLICATIONS

Vic Firth; Vic Firth Single Sided 6; http://www.amazon.com/Vic-Firth-Single-Sided-6/dp/B0002F5BFC/ref=sr_1_4?Ie=UTF8&q id=1407446372&sr=8-4&keywords=drum+practice+pad+vic+firth; 5 pages; 2014.

(Continued)

*Primary Examiner* — Kimberly Lockett
(74) *Attorney, Agent, or Firm* — Alfred M. Walker

(57) ABSTRACT

An instructional drum practice pad overlays a larger polygon base containing preferably twelve typical rudiments used in teaching musical drum playing to students. Preferably the polygonal base is a twelve sided polygon, known as a dodecagon. The lightweight durable base has a diameter of preferably about 13 inches and a height of about ½ inch, with the upper pad having a diameter of about 10 inches and being preferably a ⅜ inches thickness pad of 40 durometer gum rubber. There is a bottom base of neoprene that is about 3/16 inch thick. Rudiments, or symbolic music note symbols to teach the proper drum music beats, are provided in a peripheral array around the base frame, while leaving the striking pad free of any visual distractions. Optionally, multiple rudiment bearing rings can be stacked over the upper drum practice pad.

16 Claims, 6 Drawing Sheets

(56) References Cited

U.S. PATENT DOCUMENTS

| | | |
|---|---|---|
| 5,744,737 A | 4/1998 | Carter |
| D407,103 S | 3/1999 | Contos |
| 5,929,354 A | 7/1999 | Davis |
| 6,018,121 A | 1/2000 | Devecka |
| 6,063,992 A | 5/2000 | Schwagerl |
| 6,075,197 A | 6/2000 | Chan |
| 6,399,869 B1 | 6/2002 | Sagastegui |
| 6,525,259 B2 | 2/2003 | Sagastegui |
| D480,416 S | 10/2003 | Wilfer |
| 7,202,406 B2 | 4/2007 | Coleman |
| 7,473,836 B2 | 1/2009 | Barke |
| 2004/0035283 A1* | 2/2004 | King .................... G10D 13/08 84/411 R |
| 2013/0228061 A1 | 9/2013 | Pirtle |
| 2014/0238217 A1* | 8/2014 | Squillante ............ G09B 15/02 84/411 R |

OTHER PUBLICATIONS

Percussive Arts Society International Drum Rudiments; copyright 1984 by the Percussive Arts Society, 110 W. Washington Street, Suite A, Indianapolis, IN 46204; E-mail: Percarts@pas.org; Website: www.pas.org; 2 pages.

* cited by examiner

INSTRUCTIONAL DRUM MUSIC PRACTICE DEVICE

RELATED APPLICATIONS

This application claims the benefit of provisional patent application No. 62/039,113 filed Aug. 19, 2014 ("the '113 application") under 35 USC§119(e). The '113 application is incorporated by reference herein. This application also claims priority under 35 USC§120 from design patent application Ser. No. 29/516,125 (the '125 application), filed Jan. 29, 2015. The '125 application is incorporated by reference herein.

FIELD OF THE INVENTION

The present invention relates to practice pads with rudiment indicia for learning drum music playing.

BACKGROUND OF THE INVENTION

Among related patents is U.S. Design Pat. No. Des 407,103 of Contos, known in the music education trade as "RUDI-PAD®", which discloses a circular drum practice pad, with the entire surface of the pad covered with visually distracting music rudiment symbols.

U.S. Design Pat. No. D480,416, of Wilfer '416 describes a circular practice pad with a grid pattern of rudiments, covering substantially most, but not all, of the circular surface of a drum practice pad. U.S. Pat. No. 5,744,737 of Carter describes a drum practice kit where the rudiments are displayed on a separate chart away from the view of the student, who has to take his or her eyes away from the practice pad to read the selected rudiment notes and symbols.

A drum practice pad with a twelve sided polygonal base is sold under the trade name "VIC FIRTH" but it bears no images of rudiments imprinted thereon to observe and practice with.

Thus, the aforementioned practice pads in general are not visually ergonomically suitable for easy learning of rudiment music notes and symbols, and either have the detrimental effects of distracting the music student's clear view of the surface of the practice pad with too many rudiments, or lack any rudiments at all.

OBJECTS OF THE INVENTION

It is therefore an object of the present invention to provide a drum practice pad for teaching students to play drums.

It is also an object of the present invention to provide a visually ergonomic rotatable drumstick practice pad, which utilizes a peripheral edge displaying musical note rudiments, which promotes the learning of how to play drum music, while leaving the striking pad free of any visual distractions.

It is also an object of the present invention to provide a kit for a drum practice pad and a collection of interchangeable annular ring templates bearing rudiments to practice drum music with.

Other objects will become apparent from the following description of the present invention.

SUMMARY OF THE INVENTION

In keeping with these objects and others which may become apparent, the present invention is an instructional drum practice pad, which overlays a larger polygon, circular or oval base, containing a peripheral circumferential array of a plurality of musical note rudiment symbols, used in teaching musical drum playing to students. Preferably the polygonal base upon which the practice pad is mounted is a twelve sided polygon, known as a "dodecagon".

The base has a diameter of preferably about 13 inches from side edge to opposite side edge and a height of about ½ inch, with the upper pad having a diameter of about 10 inches and having preferably a ⅜ inches thickness pad of a resilient material used to strike against with drumsticks, such as, for example, 40 durometer gum rubber. As an alternate embodiment, the present invention also includes a mini-version with a small about 9 inch outer dodecagon pad with an about 7 inch 40 durometer gum rubber pad of about 3/16 inch thick. The base 3 may be made of any suitable material known to those in the music instruction field for supporting the drum practice pad 2 thereon, such as wood or other lightweight metallic and non-metallic materials, preferably lightweight synthetic plastics, such as, for example, the lightweight, durable plastic material known in the trade as SINTRA®.

Rudiments, or symbolic music note symbols used to teach the proper drumstick beats upon drum skin, are provided in a peripheral circumferential array around the base frame. Typically, the twelve most popular rudiments are displayed around the periphery of the base of the drum practice pad, in close visual contact with the view of the drum student observing and striking the practice pad. to practice by striking the drum pad in accordance with the repetitive beats and music notes displayed on the selected rudiment from among the circumferential array of displayed rudiments.

In the preferable larger version there is a bottom base of neoprene that is 3/16 inch thick. Alternatively, the bottom base can also contain a visually ergonomic circumferential array of other rudiments.

In contrast to the present invention, the prior art RUDI-PAD® design patent of Contos '103, consists of a circular practice pad with the rudiments printed all over the face of the pad, which distracts the student learning to play drums. In contrast, the present invention keeps the pad face clear of any marking, thereby simulating a clear, unblemished drum skin striking surface. However, also in contrast to Contos '103, the peripheral base contains a circumferential array of the most popular necessary rudiment music note symbols, so that the student can study the music notes and other symbols of the desired selected particular rudiment, without having to take his or her eyes off of the rudiment and adjacent practice pad located within the confines of the base, within the student's line of sight to the pad itself. The twelve primary rudiments encircle the periphery of the base surrounding the practice pad, and the base is rotatable for easy rotation and viewing of different selected rudiments, while leaving the striking pad free of any visual distractions.

The role of having the music symbol rudiments showing music notes and the letters "L" and "R" for left and right drumsticks located in a peripheral circumferential array surrounding the practice pad, provides drum students with the benefits of visually locating the rudiments a visually accessible region surrounding the polygonal rim of the base, without blocking the actual central practice pad with the overly busy display of rudiments, as in the prior art of Contos '103 or of the Wilfer '416 design patent, and without the necessity of having a poster sheet of rudiments located away from the student's line of sight, to the right or left of the student, as in FIGS. 8A and 8B the prior art Carter '737 patent.

Therefore, the practice pad of the present invention enhances the learning of how to play drum music by incorporating the rudiment music notes and symbols to be learned in an ergonomic visual display. The addition of the rudiments to the peripheral edge of the practice pad greatly enhances the ability of the drum music to display the rudiments, while maintaining its utility as a drum practice pad for striking with drumsticks.

The use of the encircling peripheral array of rudiments provides the practice pads with a manner of rotating the practice pad, which allows the student to change the desired rudiment being viewed during drum playing practice, while leaving the striking pad free of any visual distractions.

The important ergonomic function of the practice pad is maintained with the rotational display feature. The synergistic combination of the drum pad and peripheral base with the unique visually perceptible peripheral display of rudiments around and adjacent to the drum pad provides beneficial effects that are not possible with any other type of drum practice pad.

In a preferred embodiment, the peripheral circumferential array includes the twelve most popular drum music rudiments, but optionally the opposite bottom side of the base can have an additional circumferential array of other rudiments to be used when the student learns the first twelve primary rudiments.

In an alternate embodiment, a collection of annular ring templates is provided, each template provided with a set of rudiments imprinted thereon. Each template has an inner open circular recess which fits over the rubber drum pad and a polygonal periphery of the template, which fits over the polygon base of the drum pad.

The purpose is that, as an option, a drum music student can have a plurality of annular polygonal rudiment bearing ring templates to place over the original drum pad and base, so that the student can interchange the template with other templates, so that all of the rudiments can be practiced, not just the twelve printed on the original polygon base.

Therefore, the instructional drum music practice pad system preferably includes:

a) a base having a geometrical shape with an upper surface and a lower surface;

b) a lower base attached to said lower surface and centrally located thereon for allowing easy rotation of said base; wherein the lower base can optionally have further rudiments printed thereon.

c) a striking pad mounted on said upper surface of said base, centrally located and having a diameter less than said base forming a peripheral region on said base surrounding the striking pad;

d) musical note rudiments imprinted on said peripheral region of said base for promoting the learning of how to play drum music;

e) drum sticks for use in practicing rudiments on the striking pad; and f) whereby easy rotation of said base allows convenient changing a musical note rudiment within line of sight of a user, while leaving the striking pad free of any visual distractions.

In an optional embodiment, one or more annular templates can be stacked on the peripheral region of said base surrounding the striking pad, each template having different sets of musical rudiments, allowing for the interchanging of templates to display different sets of rudiments for a user.

Furthermore each separate template can have has musical rudiments on both upper and lower surfaces thereof.

The present invention also encompasses a method of learning drum music playing, including the steps of:

i) selecting a base having a geometrical shape with an upper surface and a lower surface;

ii) attaching a lower base to said lower surface; wherein the lower base can optionally have further rudiments printed thereon;

iii) mounting a striking pad on said upper surface of said base, centrally located and having a diameter less than said base leaving a peripheral region on said upper surface of said base surrounding the striking pad;

iv) imprinting musical note rudiments on said peripheral region of said base for promoting the learning of how to play drum music;

v) using drum sticks on the striking pad to practice rudiments displayed on said peripheral region of said base; and vi) rotating said base to shift a line of sight of a user from one musical note rudiment to another on said peripheral region of said base, while leaving the striking pad free of any visual distractions.

The method optionally includes one or more annular templates, which are stacked on the peripheral region of the base surrounding the striking pad, wherein each template has different sets of musical rudiments, and further includes the step of interchanging the templates to display different sets of rudiments for a user. The method also includes the optional step wherein each template has musical rudiments on both upper and lower surfaces thereof.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
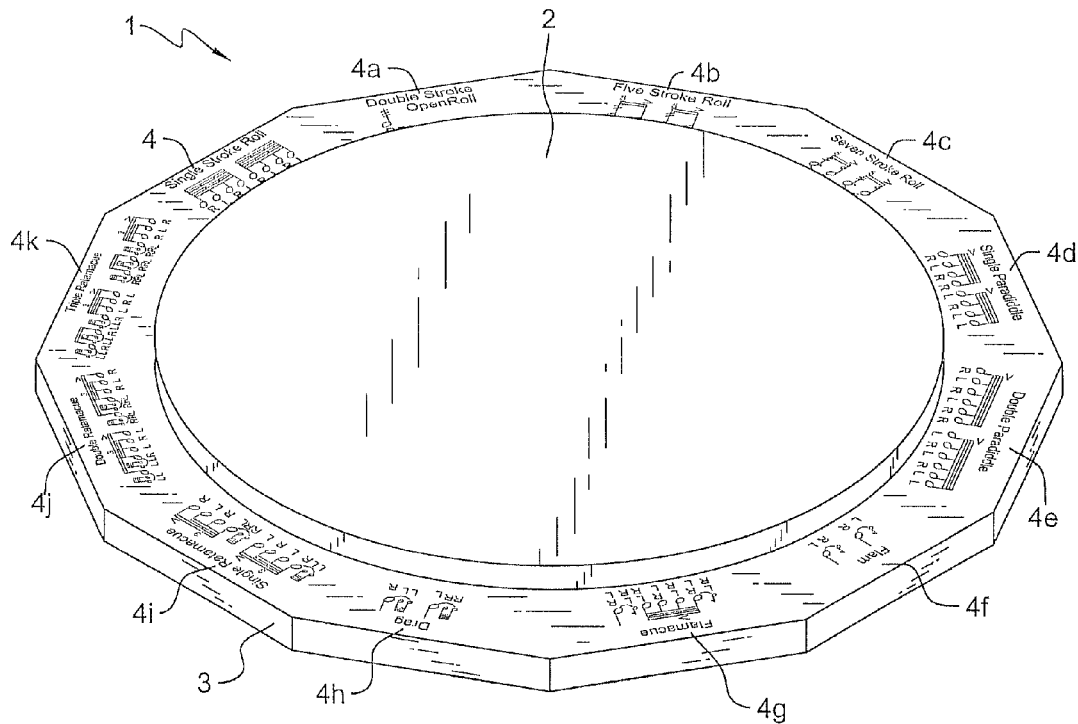
FIG. 1 is a perspective view of the drum music practice pad of the present invention.
Figure 2:
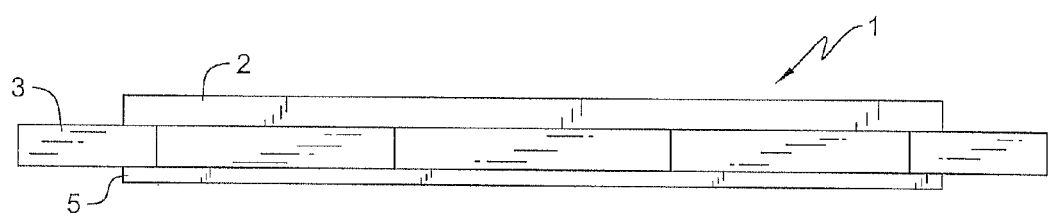
FIG. 2 is a front elevational view of the drum music practice pad of the present invention, the rear, left side and right side elevational views being mirror images thereof.
Figure 3:
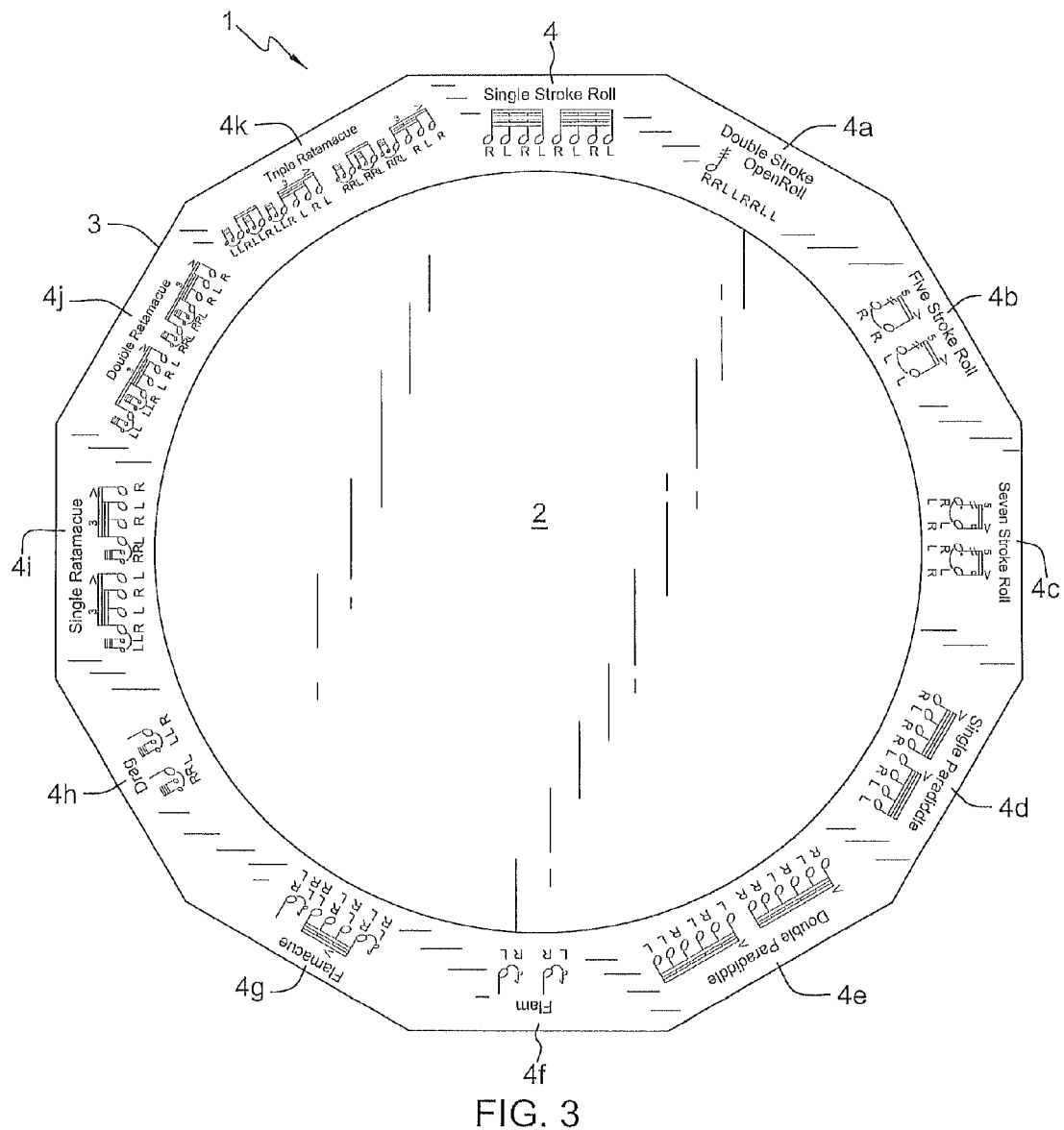
FIG. 3 is a top plan view of the drum music practice pad of the present invention.

As shown in FIGS. 1-5, the present invention is an instructional drum practice pad 1, having a geometrically shaped resilient drum stick striking pad 2, which overlays a larger polygon base containing preferably twelve typical rudiments used in teaching musical drum playing to students. Preferably the polygonal base 3 is optionally a twelve sided polygon, known as a "dodecagon".

The lightweight durable base 3 has a diameter of preferably 13 inches and a height of about ½ inch, with the upper pad 2 having a diameter of preferably 10 inches and being made of preferably a ⅜ inches thickness pad of 40 durometer gum rubber. Alternatively, a mini-version can be provided with a small 9 inch outer dodecagon resilient pad with a 7 inch 40 durometer gum rubber pad of about 3/16 inch thick.

There is in the larger version a bottom base 5 of neoprene that is 3/16 inch thick, which optionally can be used for drum practice, when base 3 optionally contains additional rudiments thereon.

Rudiments 4, 4a, 4b, 4c, 4d, 4e, 4f, 4g, 4h, 4i, 4j and 4k are symbolic music note symbols to teach the proper beats and are provided in a peripheral circumferential array around the base 3. While drawing FIG. 1 shows an example of what is known in the trade as "primary rudiments", it is assumed that any number of 40 or more different rudiments known to those skilled in the field of drum music may be displayed along the circumferential periphery of base 3.

Figure 4:
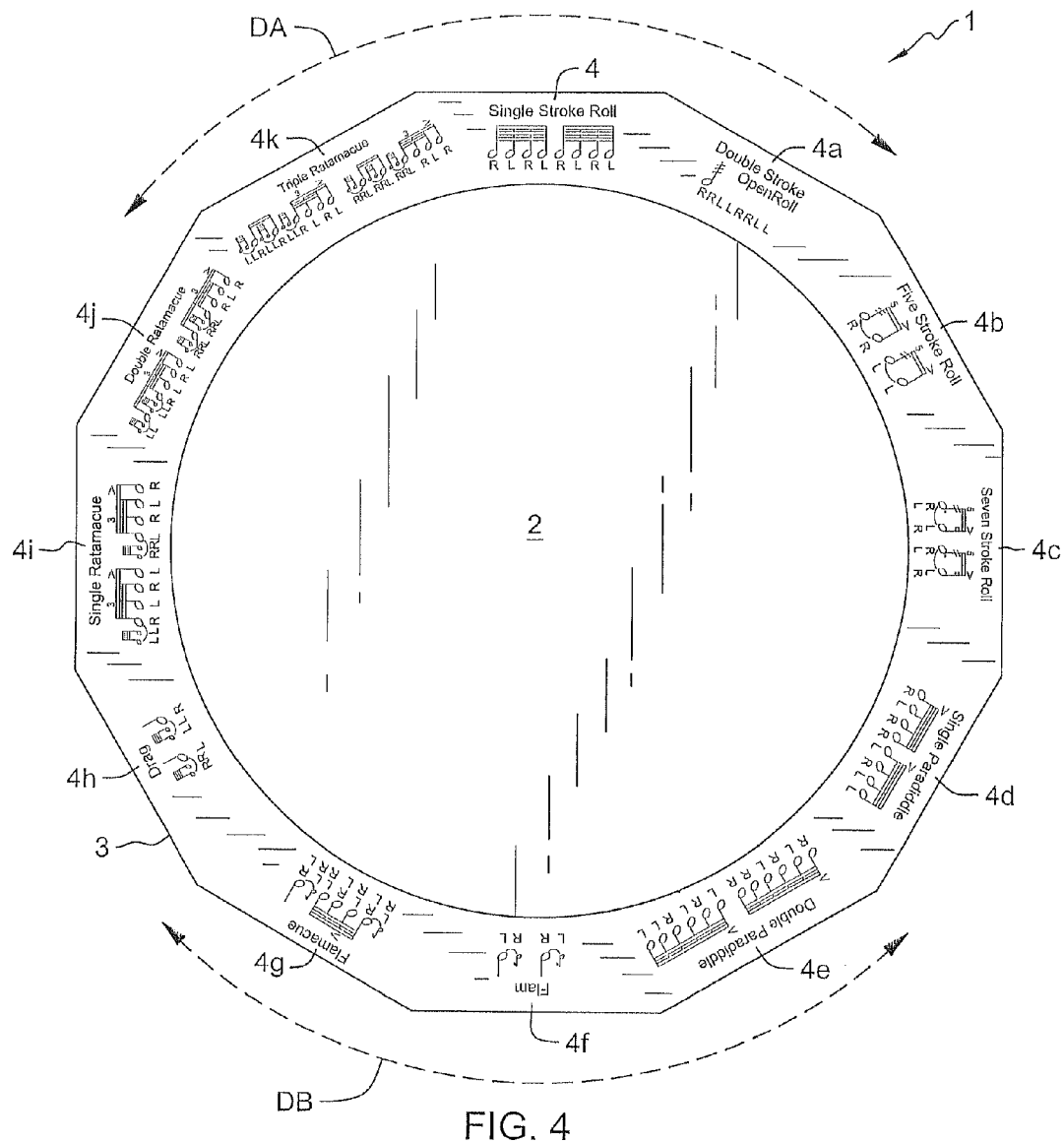
FIG. 4 is a top plan view thereof, showing rotational directions for rotating the drum practice pad until a selected rudiment portion is conveniently located in the drum music student's line of sight.

FIG. 4 shows curved directional arrows DA and DB indicating rotation of the pad to change and select whatever selected rudiment 4, 4a, 4b, 4c, 4d, 4e, 4f, 4g, 4h, 4i, 4j, 4k the student wants to choose to practice with, from the peripherally located circumferential array of rudiments 4-4k. For example, the role of these visually accessible rudiments showing music notes and "L" and "R" for left and right drumsticks, for drum students, provides the benefits of visually locating the rudiments 4, 4a, 4b, 4c, 4d, 4e, 4f, 4g, 4h, 4i, 4j, 4k them in a circumferential array surrounding the polygonal rim of the base 3, without blocking the actual central practice pad 2 with an overly busy display of rudiments thereon, as in the prior art Wilfer '416 design patent or Contos '103 design patent, and without having a rudiments' chart away from the student's line of sight, to the right or left of the student, as in FIGS. 8A and 8B of the prior art Carter '737 patent.

Figure 5:
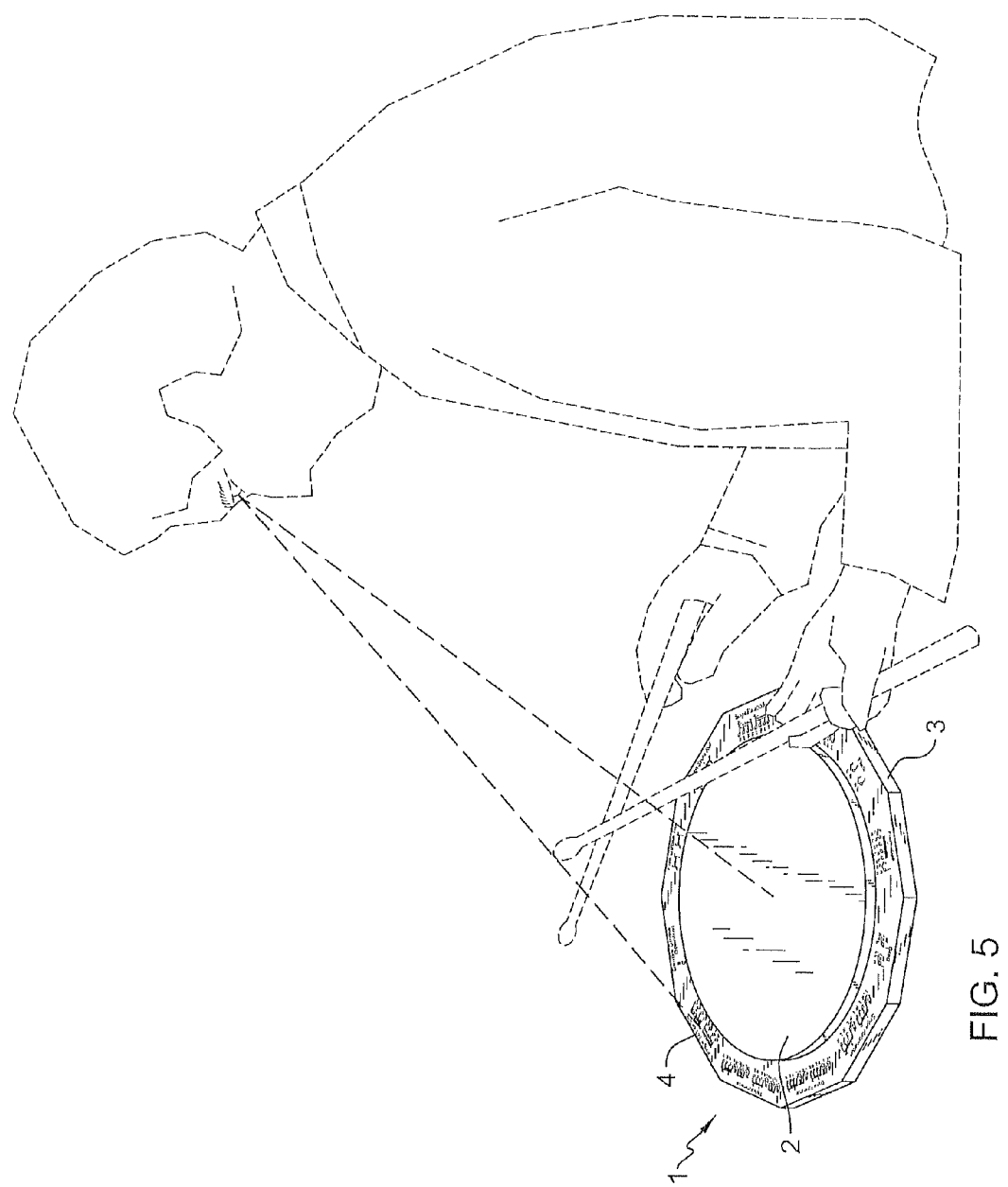
FIG. 5 is a perspective view of the drum music practice pad of the present invention, where the user's line of sight and hands with drumsticks are shown phantom lines for environmental purposes.

FIG. 5 shows the head, eyes and arms/hands of the drum music student in phantom lines, showing the student's line of sight to the pad 2 and peripheral array of rudiments 4, etc., on the base 3 itself, wherein primary rudiments 4, 4a, 4b, 4c, 4d, 4e, 4f, 4g, 4h, 4i, 4j, 4k encircle the circumferential periphery of the base 3 surrounding the practice pad 2. The base 3 is rotatable for easy rotation and viewing of one selected rudiment of the circumferential array of the plurality of rudiments 4, 4a, 4b, 4c, 4d, 4e, 4f, 4g, 4h, 4i, 4j or 4k, for the music student to practice with, by striking the drum pad 2 with drumsticks, in accordance with the repetitive beats and music notes displayed on the particular rudiment selected by the student to practice with.

Figure 6:
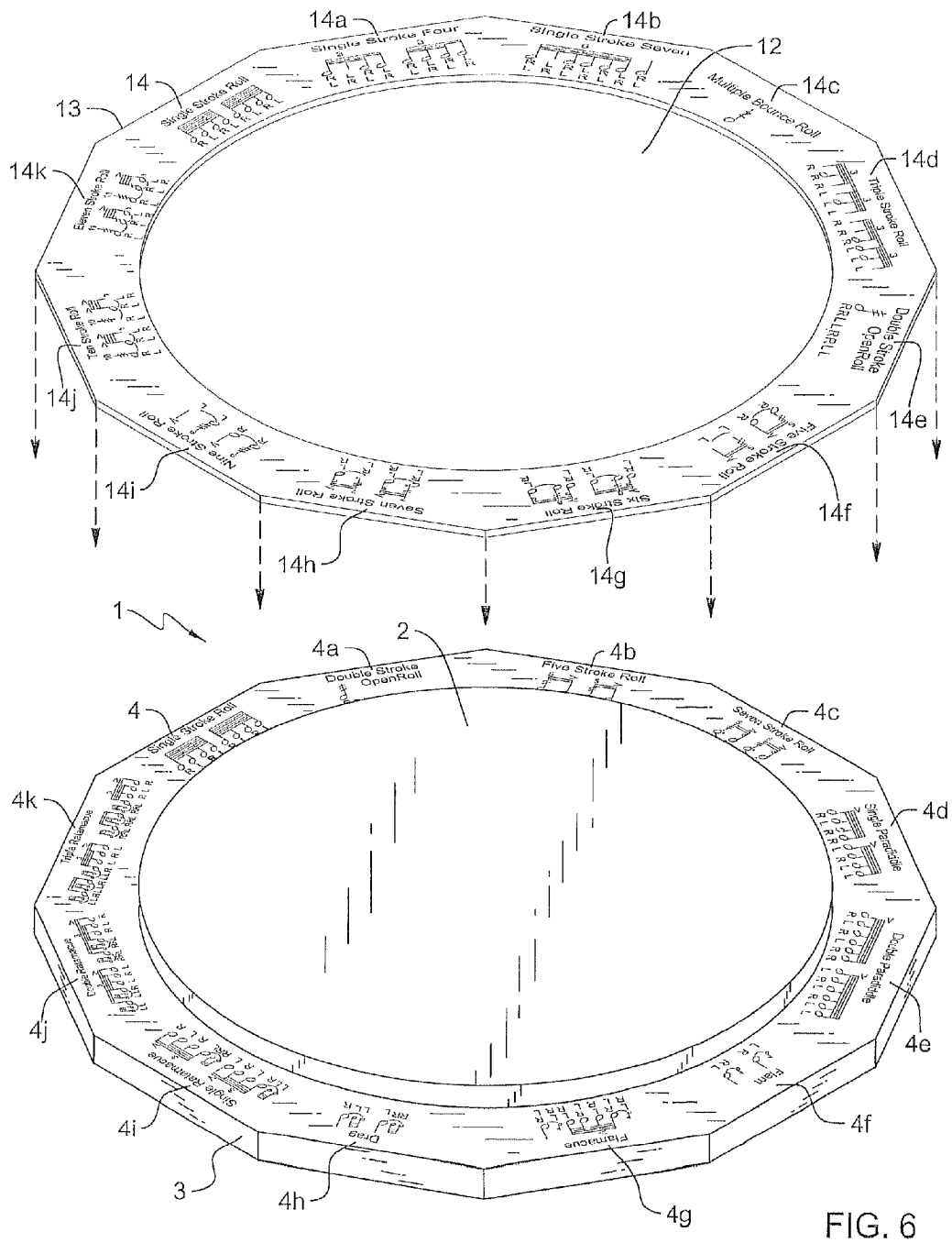
FIG. 6 is an exploded perspective view of an alternate embodiment for a drum music practice pad with an annular template from a collection of rudiment bearing templates.
Figure 7:
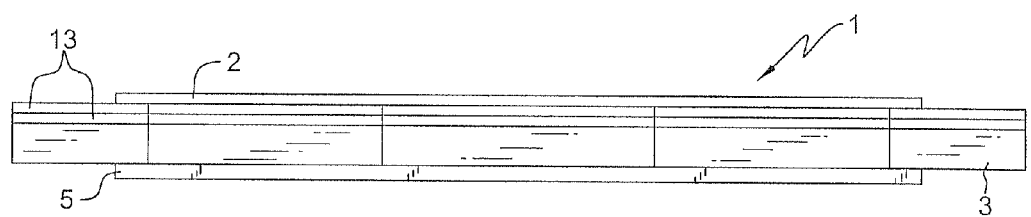
FIG. 7 is a front elevational view of the drum music pad of FIG. 6, showing stackable rudiment bearing templates stacked thereon.

As shown in the alternate embodiment of FIGS. 6 and 7, FIG. 6 is an exploded view of an annular rudiment bearing template 13 being placed upon the practice pad of FIGS. 1-5, with a set of rudiments. Each template 13 is about ⅛ inch thick and it has an open inner circular recess 12 which fits coterminous over the rubber drum pad 2. The polygonal periphery of the rudiment bearing ring template 13 sits over the polygon base 3 of the drum pad of FIGS. 1-5.

The rudiments displayed on the peripheral base of the ring template 13 are designated as 14, 14a, 14b, 14c, 14d, 14e, 14f, 14g, 14h, 14i, 14j and 14k.

The purpose is that as an option, a student can have a plurality of these polygonal ring templates 13 to place over the original drum pad 2 and base 3, so that the student can interchange the template 13, with at least one other template 13, having other rudiments imprinted thereon, so that all of the forty accepted rudiments can be practiced, not just the twelve printed on the original polygon base 3.

Since the rudiments 14a, 14b, 14c, 14d, 14e, 14f, 14g, 14h, 14i, 14j and 14k on one side of the ring 13 are the first twelve rudiments of a full set of the 40, the template 13 has the first twelve rudiments of the list of international rudiments, which are provided in a non-patent literature document, which is incorporated by reference herein. The document is identified as the "Percussive Arts Society International Drum Rudiments, ®1984" by the Percussive Arts Society of Indianapolis, Ind.

While each ring template preferably has twelve rudiments imprinted thereon, the rudiment ring templates can be printed double sided, so that one side of a first ring would have the first twelve rudiments 14, 14a, 14b, 14c, 14d, 14e, 14f, 14g, 14h, 14i, 14j and 14k, then the reverse side thereof would have the next, second twelve rudiments identified as rudiments 13 through 24.

A second separate stackable ring template would have the next twelve rudiments from 25 to 36, and the reverse side thereof, would have the final four rudiments designated as rudiments 37-40.

In that way, the student only has to stack two of the double sided rings, not four if rudiments are printed on one side only.

Each template 14, etc., has a thickness of about ⅛ inch, so that the two rings can be stacked on the rubber pad of FIG. 1, as shown in FIG. 7.

While thicknesses may vary, when two ring templates with rudiments of about ⅛ inch thickness are stacked together, they would be ¼ inch in height combined, and the final ⅛ inch would be the left over height of the ⅜ inch rubber practice pad 2 extending up from the top of the upper stacked ring template 13, which overlays the lower stacked ring template 13.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention.

We claim:

1. An instructional drum music practice pad system comprising:
   a base having a geometrical shape with an upper surface and a lower surface;
   a lower base attached to said lower surface and centrally located thereon for allowing easy rotation of said base;
   a striking pad mounted on said upper surface of said base, centrally located and having a diameter less than said base forming a peripheral region on said base surrounding said striking pad;
   musical note rudiments imprinted on said peripheral region of said base for promoting the learning of how to play drum music;
   drum sticks for use in practicing rudiments on said striking pad; and
   whereby easy rotation of said base allows convenient changing a musical note rudiment within line of sight of a user, while leaving said striking pad free of any visual distractions.

2. The system of claim 1 in which said striking pad is made of gum rubber with a thickness of about ⅜ inch.

3. The system of claim 1 in which said base has a diameter of about 13 inches.

4. The system of claim 3 in which said base has a height of about ½ inch.

5. The system of claim 2 in which said base has a polygon outer shape.

6. The system of claim 1 having a pad with an outer diameter of about 9 inches, and a gum rubber striking pad with a diameter of about 7 inches and a thickness of about 3/16 inch.

7. The system of claim 1 having one or more annular templates stacked on said peripheral region of said base surrounding said striking pad, each template having different sets of musical rudiments, allowing for the interchanging of templates to display different sets of rudiments for a user.

8. The system of claim 7 in which each template has musical rudiments on both upper and lower surfaces thereof.

9. A method of learning drum music playing comprising the steps of:
- selecting a base having a geometrical shape with an upper surface and a lower surface;
- attaching a lower base to said lower surface;
- mounting a striking pad on said upper surface of said base, centrally located and having a diameter less than said base leaving a peripheral region on said upper surface of said base surrounding said striking pad;
- imprinting musical note rudiments on said peripheral region of said base for promoting the learning of how to play drum music;
- using drum sticks on said striking pad to practice rudiments displayed on said peripheral region of said base; and
- rotating said base to shift a line of sight of a user from one musical note rudiment to another on said peripheral region of said base, while leaving said striking pad free of any visual distractions.

10. The method of claim 9 in which said striking pad is made of gum rubber with a thickness of about 3/8 inch.

11. The method of claim 10 in which said base has a diameter of about 13 inches.

12. The method of claim 10 in which said base has a height of about 1/2 inch.

13. The method of claim 12 in which said base has a polygon outer shape.

14. The method of claim 9 having a pad with an outer diameter of about 9 inches, and a gum rubber striking pad with a diameter of about 7 inches and a thickness of about 3/16 inch.

15. The method of claim 13 in which one or more annular templates are stacked on said peripheral region of said base surrounding said striking pad, each template having different sets of musical rudiments, and interchanging the templates to display different sets of rudiments for a user.

16. The method of claim 14 in which each template has musical rudiments on both upper and lower surfaces thereof.

* * * * *